(12) United States Patent
Jensen et al.

(10) Patent No.: US 11,969,082 B1
(45) Date of Patent: Apr. 30, 2024

(54) INTERCHANGEABLE READY TO ASSEMBLE FURNITURE

(71) Applicant: Ted and Helen Furniture LLC, Murray, UT (US)

(72) Inventors: Kathren Jensen, Murray, UT (US); William Bowser, Hendersonville, UT (US)

(*) Notice: Subject to any disclaimer, the term of this patent is extended or adjusted under 35 U.S.C. 154(b) by 0 days.

(21) Appl. No.: 18/049,970

(22) Filed: Oct. 26, 2022

(51) Int. Cl.
*A47B 13/02* (2006.01)
*A47B 13/08* (2006.01)

(52) U.S. Cl.
CPC ............ *A47B 13/021* (2013.01); *A47B 13/08* (2013.01); *A47B 2013/028* (2013.01)

(58) Field of Classification Search
CPC ..... A47B 13/021; A47B 13/08; A47B 13/088; A47B 2013/022; A47B 2013/028; A47B 1/04
See application file for complete search history.

(56) References Cited

U.S. PATENT DOCUMENTS

| | | | | |
|---|---|---|---|---|
| 2,154,125 | A | * | 4/1939 | Dillon ..................... A47B 1/04 108/81 |
| 2,377,211 | A | * | 5/1945 | Cocken, Jr. ............ E04F 15/06 52/578 |
| 6,629,506 | B2 | * | 10/2003 | Park ..................... A47B 91/024 248/188 |
| 10,939,676 | B1 | * | 3/2021 | Harter ...................... E04G 5/10 |
| 2012/0237142 | A1 | * | 9/2012 | Derkoski ................. A47B 3/12 108/157.1 |
| 2019/0090627 | A1 | * | 3/2019 | Lim ........................ F16B 12/48 |

* cited by examiner

*Primary Examiner* — Daniel J Rohrhoff
(74) *Attorney, Agent, or Firm* — Miller IP Law; Devin Miller

(57) ABSTRACT

Described herein are examples of interchangeable ready to assemble furniture the include furniture top components including multiple furniture leaves, and furniture hardware components that include a connector assembly that allows the multiple furniture leaves to be easily assembled and disassembled. The interchangeable ready to assemble furniture additionally includes sturdy easy to assemble furniture legs that do not require additional support features, such as a furniture skirt. The interchangeable ready to assemble furniture can be arranged in different configurations and is capable of being constructed from high quality hard wood.

20 Claims, 14 Drawing Sheets

INTERCHANGEABLE READY TO ASSEMBLE FURNITURE

BACKGROUND

Furniture is a staple for all homes, from studio apartments to fifty room mansions. Historically furniture was built outside of the home and transported to the house fully assembled. Modern furniture often comes either assembled or ready to be assembled. Assembled furniture can range from expensive and high quality to inexpensive and low to moderate quality. Ready to assemble furniture is often inexpensive, low quality and time consuming to assemble.

BRIEF DESCRIPTION OF THE DRAWINGS

The present description will be understood more fully when viewed in conjunction with the accompanying drawings of various examples of interchangeable ready to assemble furniture. The description is not meant to limit the interchangeable ready to assemble furniture to the specific examples. Rather, the specific examples depicted and described are provided for explanation and understanding of the interchangeable ready to assemble furniture. Throughout the description the drawings may be referred to as drawings, figures, and/or FIGS.

FIG. 3 illustrates an exploded furniture hardware component, according to an embodiment.

Figure 1:
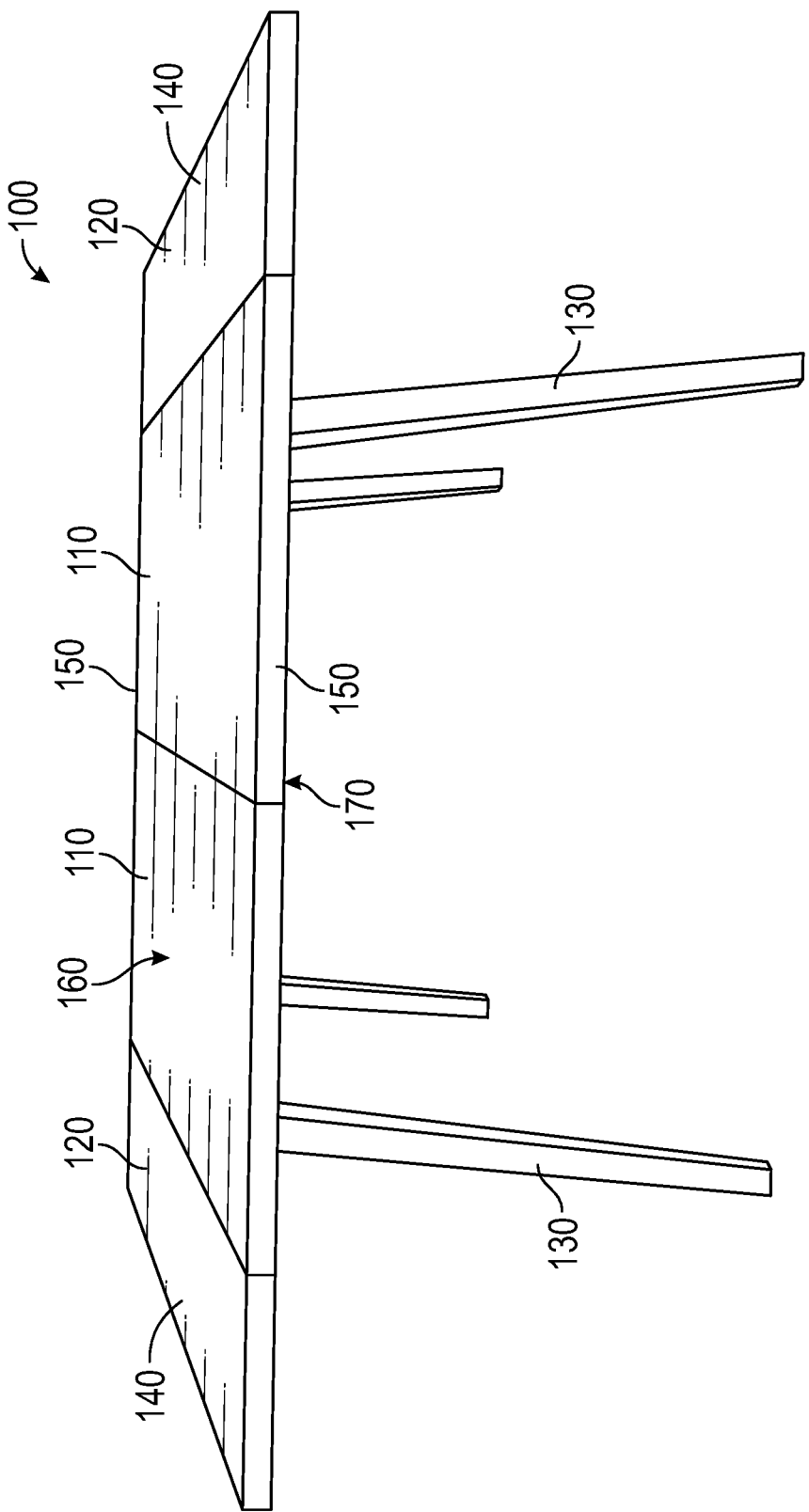
FIG. 1 illustrates an assembled interchangeable ready to assemble furniture, according to an embodiment.

DETAILED DESCRIPTION interchangeable ready to assemble furniture as disclosed herein will become better understood through a review of the following detailed description in conjunction with the figures. The detailed description and figures provide merely examples of the various embodiments of interchangeable ready to assemble furniture. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional ready to assemble furniture is often prepared from low quality and inexpensive materials. Ready to assemble furniture is easy to transport because it is relatively light, compared to fully assembled high quality furniture, and usually is packaged in low volume packages. Light weight and low volume packaging allow for ease of transportation for ready to assemble furniture, both for the retailor and for the customer. Unfortunately, the materials conventionally employed for ready to assemble furniture is of low quality, such as plywood, particle board, balsa wood or other light weight inexpensive materials.

Hard wood furniture requires a high level of craftsmanship and rigid construction techniques. The proper assembly and structural support needed for high quality hard wood furniture has traditionally required either offsite assembly followed by delivery of the assembled furniture ("white glove delivery"), or on-site assembly performed by skilled technicians with specialty power tools. Neither of the preceding services allows for self-assembly or inexpensive delivery. Further, modern urban apartment building and even some residential housing have limited ability to accept large volume delivery of fully assembled furniture.

Implementations of interchangeable ready to assemble furniture may address some or all of the problems described above. interchangeable ready to assemble furniture may alleviates many of the issues related to transportation and delivery of large furniture. Modern urban housing, suburban and even rural housing have limited entryway space. Additionally, urban parking for delivery trucks, lobbies and elevators make delivery even more complicated in urban apartment buildings. Ready to assemble furniture has solved some of these problems, however, most ready to assemble furniture is of very low quality and requires hours of assembly with equally low-quality hardware components and generic assembly tools. Moreover, conventional ready to assemble furniture cannot be disassembled without destroying the furniture because of the low quality of the furniture materials and hardware. Additionally, because of the difficulty, or complete inability, to disassemble ready to use furniture, there is very little ability to provide Modular ready to assemble furniture because of the need to assemble, disassemble, and reassemble component pieces of the furniture.

Embodiments of the interchangeable ready to assemble furniture include high grade and structurally sound component pieces that are capable of supporting real wood or similar high-end construction materials. Further, embodiment of the interchangeable ready to assemble furniture employ high quality hardware and support components that enable repeated assembly, disassembly, and reassembly of the component pieces to allow for interchangeable use. The use of high-end construction materials with high quality hardware components allows for sturdy, fashionable, high quality real wood furniture to be available as interchangeable ready to assemble furniture. This solves numerous problems presented by conventional furniture, including shipping, delivery, assembly, restricted sizes, product longevity, stability, and versatility.

The high stability provided by embodiments employing the furniture top components and hardware components and the compression and strength of the furniture leg components allows for sturdy furniture construction, such as furniture construction that does not require a skirt, support beam, brackets etc..... Such items are support components on the bottom of furniture that provide added stability and support at the junction of the furniture top and the furniture legs. Removing the furniture skirt, beam or bracket provides less complicated assembly, a lighter overall piece of furniture, less required construction materials, and a more aesthetic appearance. Additionally, embodiments provide greater stability than conventional furniture because of the high-quality hardware and assembly features provided by the furniture hardware components and furniture top components of the embodiments.

FIG. 1 illustrates an assembled interchangeable ready to assemble Table 100 (or table 100), according to an embodiment. The interchangeable ready to assemble Table 100 includes two large furniture leaves 110 (singular large furniture leaf 110 and plural large furniture leaves 110) and two small furniture leaves 120 (singular small furniture leaf 120 and plural small furniture leaves 120). Additionally, the interchangeable ready to assemble Table 100 includes four furniture legs 130. The interchangeable ready to assemble Table 100 includes two furniture head ends 140 and two furniture side ends 150. Embodiments of the interchangeable ready to assemble Table 100 are rectangular with the furniture head end 140 at the short horizontal widths of the furniture, and the furniture side end 150 on the long horizontal lengths of the furniture. For purposes of this patent application length of the furniture, or furniture leaves, will refer to the longer horizontal length of the overall furniture 150, and the width of the furniture, or furniture leaves, will refer to the short horizontal width of the overall furniture 140. The distance from a first furniture side end 150 to a second furniture side end 150 is the length, and the distance from a first furniture head end 140 to a second furniture head end 140 is the width.

Embodiments include a large furniture leaf 110 with a length between 24 and 36 inches. Embodiments include a small furniture leaf 120 with a length between 8 and 24 inches. The width of the small and large furniture leaves 110, 120 may be between 30 and 42 inches, between 42 and 60 inches, between 60 and 96 inches, and so forth.

Embodiments include a furniture leg 130 with a length between 17.5 and 28.5 inches, between 15 and 30 inches, between 6 and 42 inches, and so forth. The furniture leg can be cylindrical, square, tapered or other shapes that can be configured around or accept a rigid straight leg rod 1200. Embodiments of the diameter or cross section of the furniture leg 130 may be between 3 and 3 inches, between 3 and 5 inches, between 5 and 8 inches, and so forth.

In embodiments, the large furniture leaf 110 is rectangular with a width greater than its length. Additionally, in embodiments, the small furniture leaf 120 is rectangular with a width greater than its length. The large furniture leaf 110 and the small furniture leaf 120 also contain a furniture side end 150 (horizontal length) and a furniture head end 140 (horizontal width). In embodiments, the small furniture leaves 120 have a length that is 50 to 75% of the length of the large furniture leaves, 40-60% of the length of the large furniture leaves, 50% of the length of the large furniture leaves 110. The width of the large furniture leaves 110 and small furniture leaves 120 is generally equal to have a consistent rectangular shape and to allow for the interchangeable ability of the interchangeable ready to assemble Table 100.

The interchangeable ready to assemble Table 100 includes a furniture top 160 and a furniture bottom 170. The furniture top 160 is the flat surface facing upwards when the interchangeable ready to assemble Table 100 is assembled and in the upright position. The furniture bottom 170 is the flat surface facing downwards when the interchangeable ready to assemble table 100 is assembled and in the upright position.

Embodiments of the interchangeable ready to assemble table 100 further includes five furniture leg plate 1300 that are affixed to the large furniture leaf 110. In embodiments, five furniture leg plates 1300 are affixed to a first large furniture leaf 110, and additional five furniture leg plates 1300 are affixed to a second large furniture leaf 110. In embodiments four furniture legs 130 are affixed towards the furniture side end 150 of the large furniture leaf 120 on the furniture bottom 170. Placement of the furniture leg 130 on the interchangeable ready to assemble table 100 can be varied to provide optimal support for the interchangeable ready to assemble table 100 and/or to provide aesthetic qualities. Embodiments include four furniture legs 130, but additional furniture legs 130 can be employed, particularly in interchangeable formations that include multiple small and large furniture leaves 110, 120.

The interchangeable ready to assemble table 100 also contains a thickness dimension. For purposes of this patent application, the thickness of the interchangeable ready to assemble table 100 will refer to the vertical distance or height of the small or large furniture leaves 110, 120. The thickness is generally equal to provide consistency and modularity to the interchangeable ready to assemble table 100. Additionally, the thickness is between 1.5 inches and 3 inches.

Figure 2:
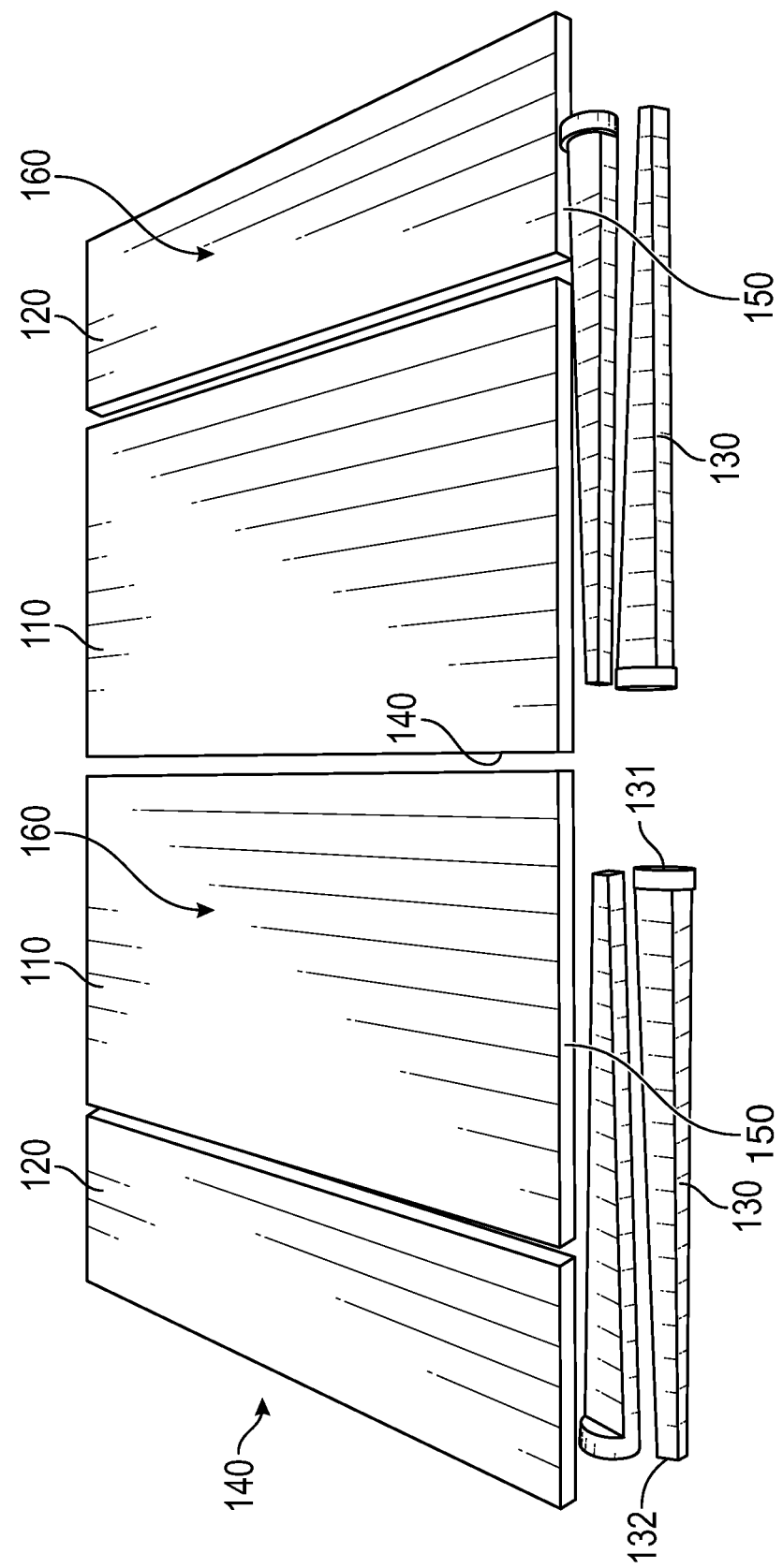
FIG. 2 illustrates an unassembled interchangeable ready to assemble furniture, according to an embodiment.

FIG. 2 illustrates an unassembled interchangeable ready to assemble table 100, according to an embodiment. The unassembled interchangeable ready to assemble table 100 includes furniture top components including large furniture leaves 110 and small furniture leaves 120. The unassembled interchangeable ready to assemble table 100 also includes furniture legs 130. The unassembled interchangeable ready to assemble table 100 as illustrated in FIG. 2 demonstrates the easy ability to store, pack, deliver and/or transport the interchangeable ready to assemble table 100. The furniture top components and the furniture legs can be easily stacked and packaged to provide an overall dimension of the unassembled table 100 that is 60-80% less than the overall dimensions of the assembled table 100.

The disassembled or unassembled furniture top components and furniture legs demonstrate the ease by which a large piece of furniture can be packaged and transported to a home or other destination for use, in an easier manner than a fully assembled furniture.

The furniture legs 130 further contain an aperture or channel that is cut through the interior of the furniture leg 130 lengthwise (lengthwise with regard to the furniture leg 130 means the vertical length of the furniture leg 130 in the assembled furniture formation). The aperture run from a furniture leg top 131 to a furniture leg bottom 132 and is configured to accept a leg rod 1200.

Figure 3:
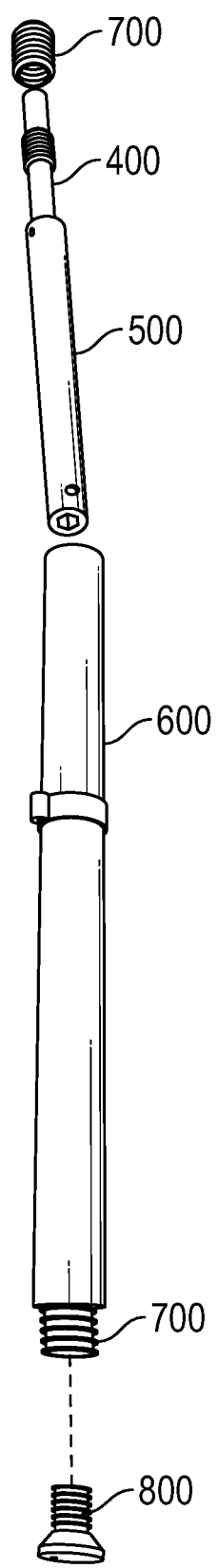
FIG. 3 illustrates

FIG. 3 illustrates an exploded furniture hardware component. FIG. 3 illustrates a housing tube screw 700, connector 400, connector rod 500, housing tube 600 and housing tube screw cap 800, according to an embodiment. FIG. 3 illustrates the furniture hardware components of the interchangeable ready to assemble table 100. The furniture hardware components provide structural support to the furniture top components and furniture legs, and allow for the assembly and disassembly of the furniture top components. The furniture hardware components are incorporated into the furniture top components. Embodiments include the housing tube 600 embedded in the furniture leaves 110, 120. Generally, the housing tube 600 will be positioned or located within the furniture leaves 110, 120 running parallel to the furniture side end 150. The connector rod 500 is engaged with the housing tube 600 via a housing tube screw 700. A connector 400 is engaged with the connector rod 500. Additionally, the housing tube screw cap 800 engages with a second housing tube screw 700 that is embedded into the wood after the first tube screw 700.

Figure 4:
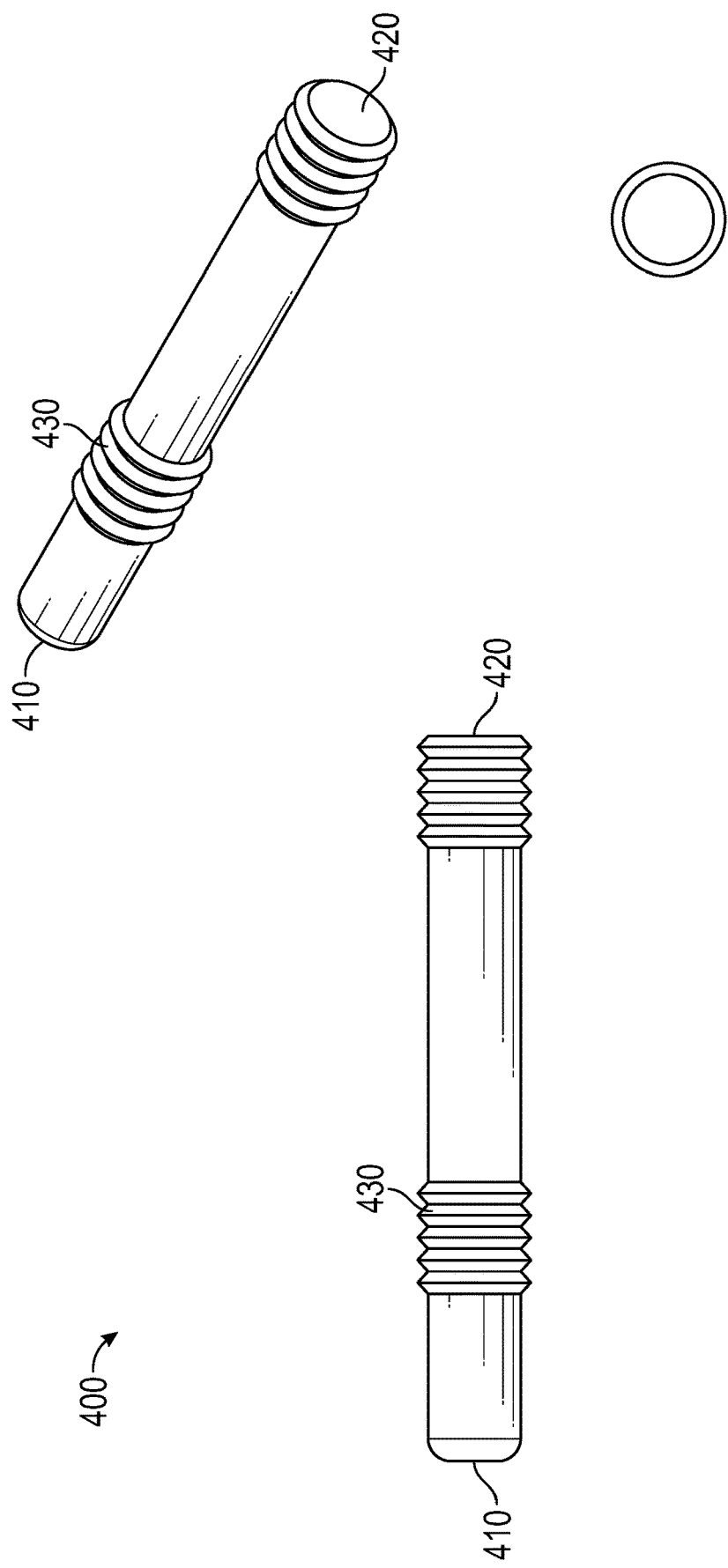
FIG. 4 illustrates a connector, according to an embodiment.

FIG. 4 illustrates a connector 400, according to an embodiment. The connector 400 is a generally cylindrical tube that includes an unthreaded end 410 and an exterior threaded end 420. The connector 400 further contains a second threaded portion 430 located between the unthreaded end 410 and the exterior threaded end 420. Embodiments include connectors 400 that are between 3.25 and 3.25 inches, 2.75 and 3.5 inches, 2.75 to 4 inches in length, and so forth. The diameter of the connector 400 is between 0.42 and 0.5 inches, 0.5 and 0.75 inches, 0.5 and 1 inches, and so forth. The threading on the connector 400, at both the exterior threaded end 420 and the second threaded portion 430 is 1.5 to 1.5 inches in length, 2.5 to 2.5 inches in length, between 2 and 4 inches in length, and so forth. The threads on the connector 400 are configured to engage threads inside the connector rod 500 and the housing tube screws 700.

Figure 5:
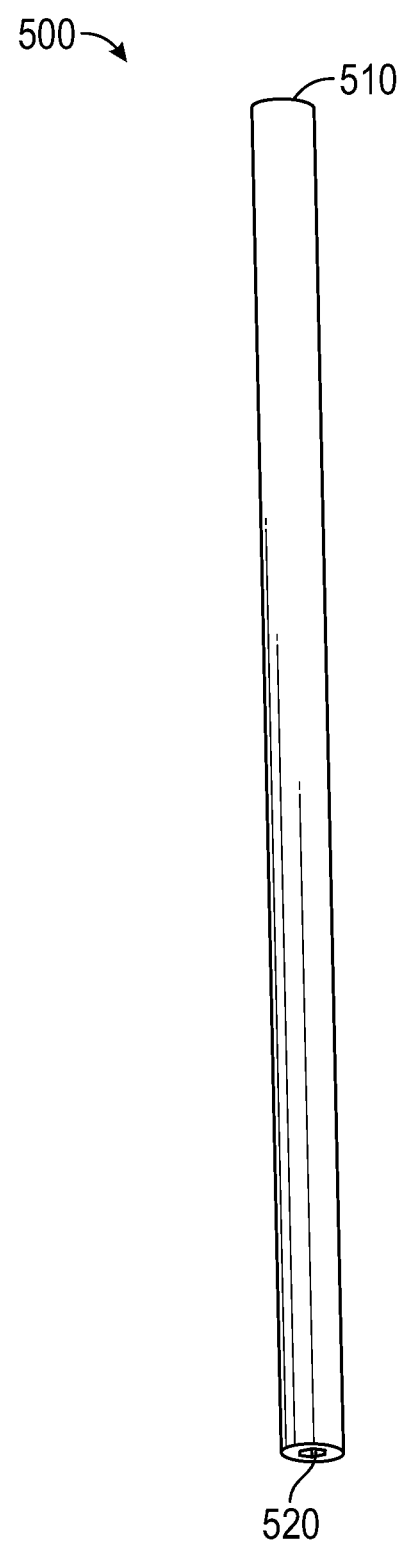
FIG. 5 illustrates a connector rod, according to an embodiment.

FIG. 5 illustrates a connector rod 500, according to an embodiment. The connector rod 500 is a generally cylindrical tube that contains an interior threaded end 510 and a tool head end 520. The connector rod 500 is configured to engage with the exterior threaded end 420 of the connector 400 with the interior threaded end 510, and engage with the housing tube 600 at the tool head end 520. The connector rod 500 is smaller in diameter than the housing tube 600 and larger in diameter than the connector 400. Embodiments include connectors rod 500 that are between 6 and 18 inches, 18 and 24 inches, 24 to 43 inches in length, and so forth. The diameter of the connector rod 500 is between 0.625 and 0.75 inches and so forth.

Figure 6:
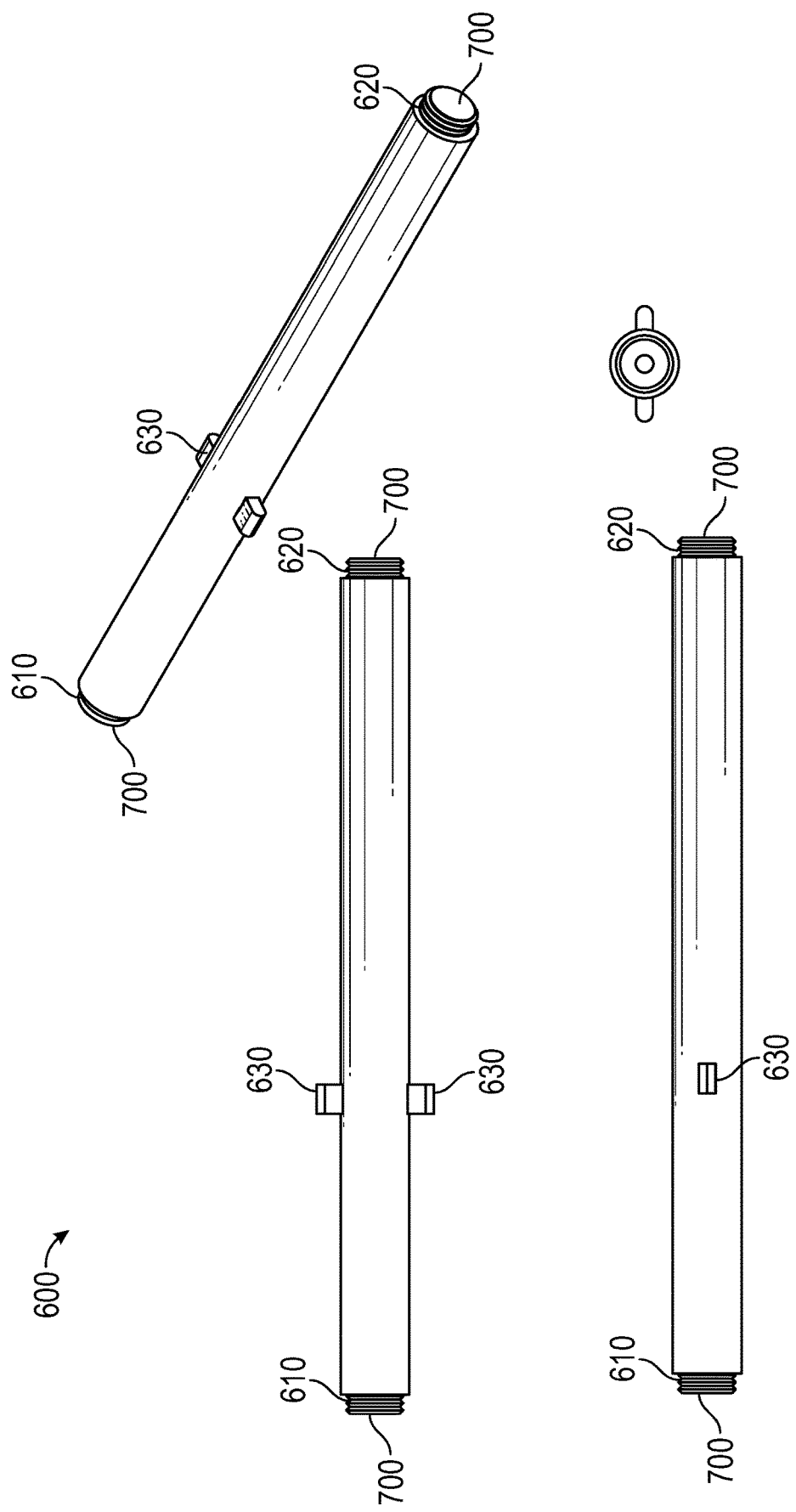
FIG. 6 illustrates a housing tube, according to an embodiment.

FIG. 6 illustrates a housing tube 600, according to an embodiment. The housing tube 600 is generally cylindrical with a first interior threaded end 610 and a second interior threaded end 620. The first and second interior threaded ends 610, 620 have interior threads configured to engage with the housing tube screws 700. Additionally, the first and second interior threaded ends 610, 620 are designed and/or configured to accept a connector rod 500. The housing tube 600 has a diameter that is greater than the housing tube screws 700, the connector rod 500 and the connector 400. Embodiments include housing tube 600 that are between 5 and 12 inches, 12 and 23 inches, 23 to 35 inches in length, and so forth. The diameter of the housing tube 600 is between 0.52 and 0.62 inches, and 0.625-0.75 inches and so forth.

The housing tube 600 can be prepared in various lengths and diameters to accommodate the structural needs of the furniture top components. In embodiments, where the large furniture leaf 110 is double the size of the short furniture leaf 120, the housing tube can be prepared in two different lengths, a short housing tube 600 and a long housing tube 600. Embodiments can include a long housing tube 600 that is double the length of the short housing tube 600. Intermediate lengths can also be employed. The remaining furniture hardware components will generally be the same dimension for a single embodiment, to allow modularity, interchangeability and compatibility of the furniture hardware and furniture top components.

The housing tube 600 further includes appenditures 630 that extend from the horizontal length of the housing tube 600. The appenditures 630 can be located midway between the first and second interior threaded ends 610, 620, or can be located closer to either end of the housing tube 600. The appenditures 630 can be generally rectangular in shape and can have a length between 0.313 and a width of 0.375 and a height of 0.200. Sizes can vary in relation to how thick furniture leaf 110 or 120 are and the overall diameter of 600. The appenditures 630 provide added stability to the housing tube 600 while it is embedded in the furniture leaf 110, 120. The appenditures 630 is configured to stop the housing tube from rotating while embedded in the furniture leaf 110, 120, particularly, during assembly or disassembly of the interchangeable ready to use table 100. Embodiments of the appenditures 630 can include generally flat and narrow plates, cuffs, pins or tabs surrounding the housing tube 600 to increase the stability of the housing tube 600 within the furniture leaf 110, 120, and to prevent rotation of the housing tube 600.

Embodiments employ a computer numerical control (CNC) router to cut an opening or aperture inside the material used for the furniture leaf 110, 120 to embed the housing tube 600. The CNC router further cuts openings or apertures leading longitudinally away from the housing tube 600 aperture to allow for passage of the connector 400, connector rod 500, and housing tube screws 700. Two portions of a furniture leaf 110, 120 will be subject to the CNC router to create two apertures, the housing tube 600 with appenditures 630 can be placed within the apertures created in the furniture leaf 110, 120 and the two portions of the furniture leaf 110, 120 are sealed together via glue, other adhesives, pressure, heat, and/or other suitable methods.

In an alternate embodiment, particularly for embodiment employing real wood, the furniture table leaves 110 and 120 are drilled longitudinally to create apertures large enough to accommodate the housing tube 600. The drill enters the furniture head end 140. Embodiment employ four drilled apertures to accommodate four housing tubes 600. Embodiments can be prepared where wood sections drilled to create apertures, holder rods are employed to join multiple wood sections followed by gluing of those sections together to create furniture leaves 110 and 120. Next, after the glue has dried, the holder rod is removed, and connector 400, connector rod 500, housing tube 600 and housing tube screw 700 are inserted into the furniture table leaves. Finally, the aperture is threaded and an additional housing tube screw 700 is inserted into the furniture table leaf.

Figure 7:
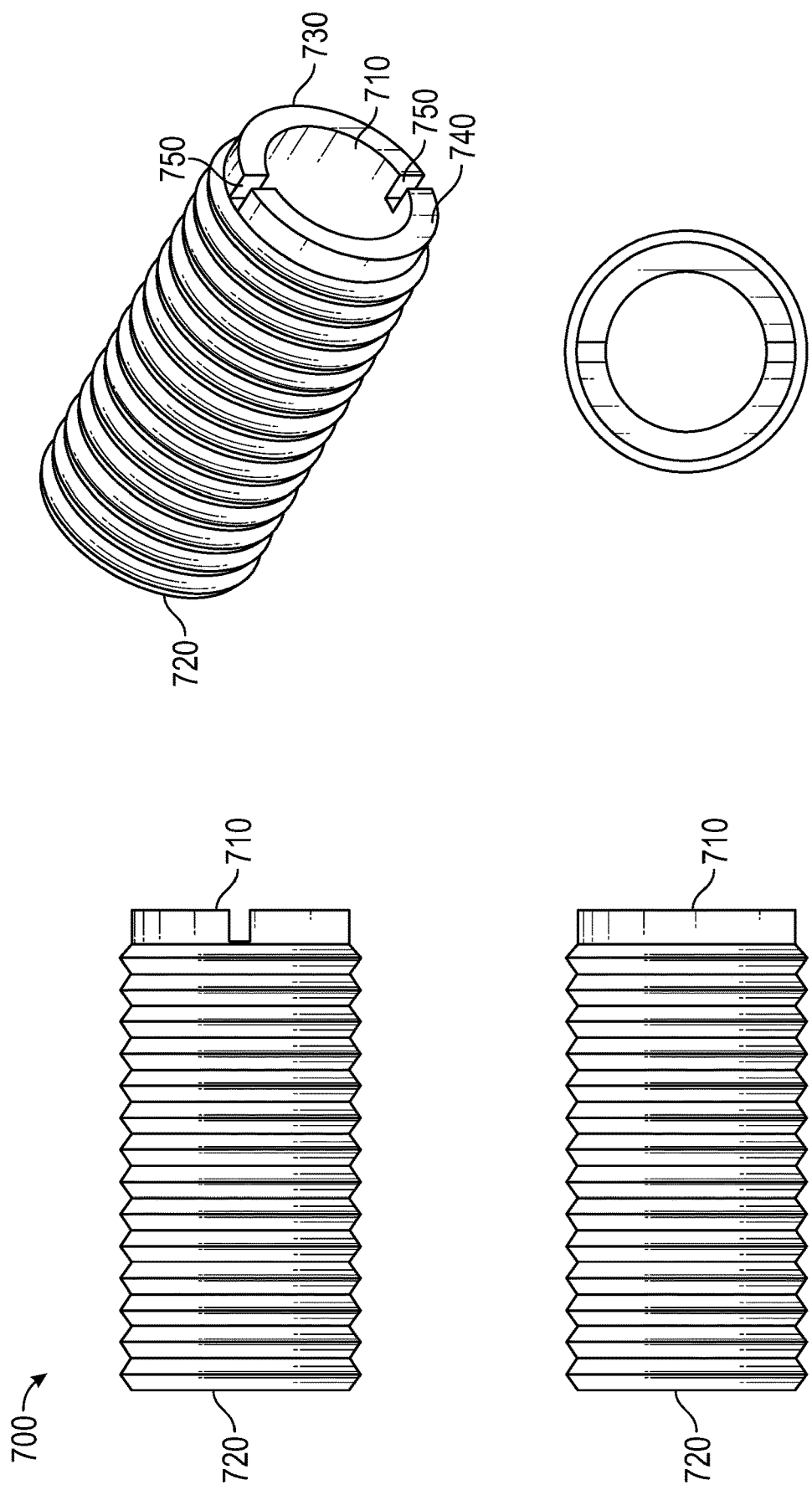
FIG. 7 illustrates a housing tube screw, according to an embodiment.

FIG. 7 illustrates a housing tube screw 700, according to an embodiment. The housing tube screw 700 is a threaded generally cylindrical tube that includes a front end 710 and a back end 720. The front end 710 of the housing tube 700 includes a first semi-circle end 730 and a second semi-circle end 740 that form the front end 710. The first and second semi-circle ends 730, 740 are separated by a tube end aperture 750 that is configured to be engaged by a tool to turn the housing tube screw 700 into place.

The housing tube screw 700 has a diameter that is smaller than the housing tube 600 and greater than the connector rod 500 and the connector 400. Embodiments include housing tube screw 700 that are between 1.5 and 1.5 inches and so forth. The diameter of the housing tube screw 700 is between 0.75 and 0.875 inches, and so forth.

Figure 8:
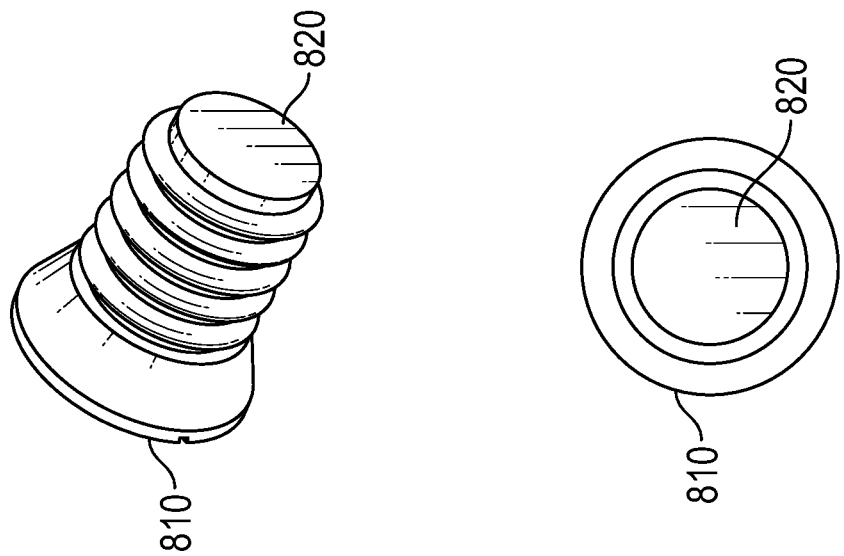
FIG. 8 illustrates a housing tube screw cap, according to an embodiment.
Figure 8:
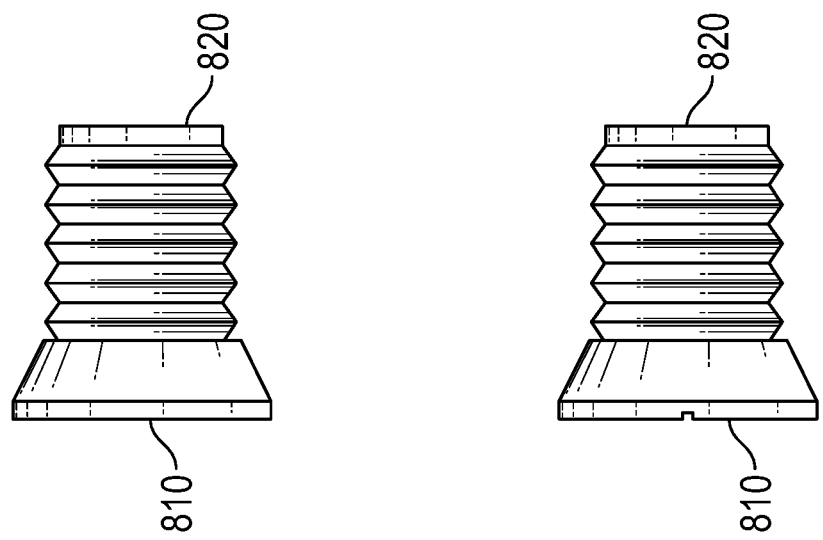

The housing tube screw 700 is configured to fit inside the housing tube 600 and engage the interior threads of the housing tube 600. The housing tube screw 700 is further configured to fit over and engage the threaded end 420 and the second threaded portion 430 of the connector 400. The housing tube screw 700 is further configured to engage with threads inside the wood or other material at furniture head end 140. In FIG. 8 illustrates a housing tube screw cap 800, according to an embodiment. The housing tube screw cap 800 is a tapered cylindrical screw that has a screw head end 810 and a back end 820. The housing tube screw cap 800 is configured to engage with the housing tube screw 700. The housing tube screw cap 800 is threaded and screws into the housing tube screw 700. The threaded portion of the housing tube screw cap 800 has a smaller diameter than the housing tube screw 700 allowing it to be threaded or screwed into the housing tube screw 700. The housing tube screw cap 800 provides a finished appearance to the interchangeable ready to assemble table 100 by enclosing the apertures created to embed the housing tube 600, connectors 400 and connector rods 500. When the housing tube screw cap 800 is engaged with the housing tube screw 700 at a furniture head end 140 the exterior of the furniture has a flush finished appearance with little indication of the interior furniture hardware components.

Figure 9:
FIG. 9 illustrates an assembled connector, connector rod, housing tube and housing tube screw, according to an embodiment.

FIG. 9 illustrates an assembled connector 400, connector rod 500, housing tube 600 and housing tube screw 700, according to an embodiment. In the embodiment illustrated in FIG. 9 the connector 400 has been engaged with the connector rod 500 via insertion of the exterior threaded end 420 of the connector 400 into the interior threaded end 510 of the connector rod 500. A first housing tube screw 700 is then screwed over the second threaded portion 430 of the connector 400 and positioned between the second threaded portion 430 and the exterior threaded end 420 of the connector 400. Next the connector 400-connector rod 500-first housing tube screw 700 is engaged with the housing tube 600 via engaging the housing tube screw 700 with a first interior threaded end 610 of the housing tube 600. A second housing tube screw 700 is engaged with the second interior threaded end 620 of the housing tube 600. The embodiment of the furniture hardware components illustrated in FIG. 9 are embedded in the furniture leaves 110, 120 running parallel to the furniture side end 150. The furniture hardware components run in apertures or channels that have been cut by CNC routers that run the length of the furniture leaves 110, 120. Embodiments include between two and eight apertures and a matching number of furniture hardware components per furniture leaf 110, 120. four apertures and four matching furniture hardware components are employed per furniture leaf 110, 120. The number of apertures and matching furniture hardware components can be varied based on the desired stability, weight of the furniture top component materials, and other structural factors.

A tool, such as a long screw driver, a long allen wrench, or similar tool can be inserted into the housing tube 600 on the end opposite the connector 400-connector rod 500-first housing tube screw 700 component, and engaged with the tool head end 520 of the connector rod 500 to twist or rotate the connector 400-connector rod 500 thereby lengthening or shortening the distance the connector 400 extends from the housing tube 600. This allows for the furniture leaves 110, 120 to be engaged and disengaged from neighboring furniture leaves 110, 120.

Figure 10:
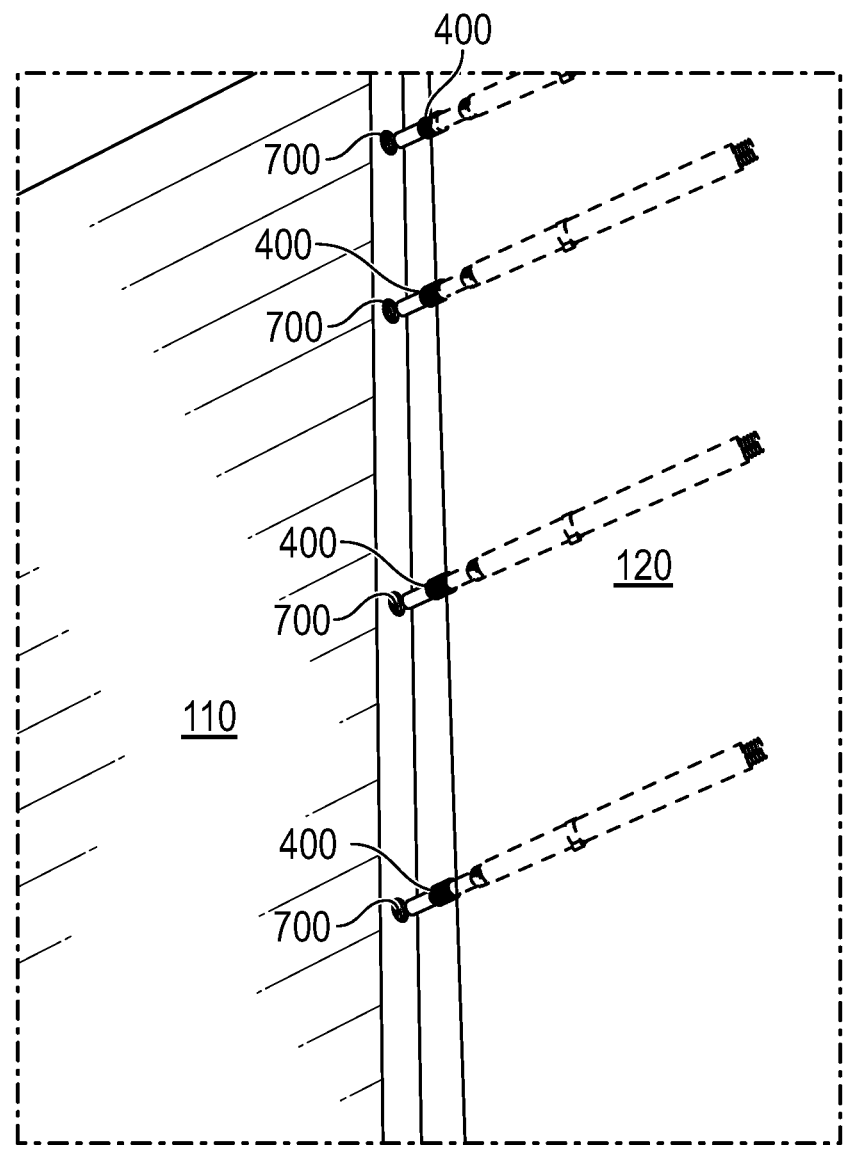
FIG. 10 illustrates two disassembled furniture leaves, according to an embodiment.

FIG. 10 illustrates two furniture leaves 110, 120, according to an embodiment. The two neighboring furniture leaves 110, 120 illustrated in FIG. 10 demonstrate the assembly of the interchangeable ready to assemble table 100. Large furniture leaf 110 is located on the left side of FIG. 10 and small furniture leaf 120 is located on the right side of FIG. 10. Four sets of unthreaded ends 410 of the connectors 400 are protruding from the apertures on the furniture head end 140 of the small furniture leaf 120. The unthreaded ends 410 are inserted into the housing tube screws 700 that are located in the apertures in the furniture head end 140 of the large furniture leaf 110. The unthreaded ends 410 are designed and configured to be inserted into the housing tube screws 700 without having to be screwed thereby allowing for the large furniture leaf 110 to support the small furniture leaf 120 prior to engagement of the threaded components. This allows the weight of the small furniture leaf 120 to be supported by the large furniture leaf 110 (which can be supported by furniture legs 130) making assembly easier. Embodiments can be prepared with little or no length of unthreaded end 410 of the connector 400, however, this would reduce the ability of the furniture leaves 110, 120 to support each other prior to final engagement of the threaded components. After the unthreaded ends 410 have been inserted into the housing tube screws 700 in the large furniture leaf 110, a tool is inserted into an aperture on the furniture head end 140 of the small furniture leaf 120 opposite the connectors 400. The tool is inserted into the tool head end 520 and twisted to turn the connector rod 500 and connector 400 engaging the second threaded portion 430 with the housing tube screw 700 in the large furniture leaf 110. The tool is twisted until the two furniture leaves 110, 120 are flush. This is done for all four furniture hardware components until the leaves 110, 120 are flush, the furniture hardware components are partially engaged before they are fully tightened to make the furniture leaves 110, 120 flush. A housing tube screw cap 800 is then screwed into the housing tube screws 700 in the second housing tube screw 720 located in the opposite furniture head end 140 of the small furniture leaf 120 where the tool was inserted. This provides a flush finish to the furniture head end 140 that is viewable after assembly of the table 100.

Figure 11:
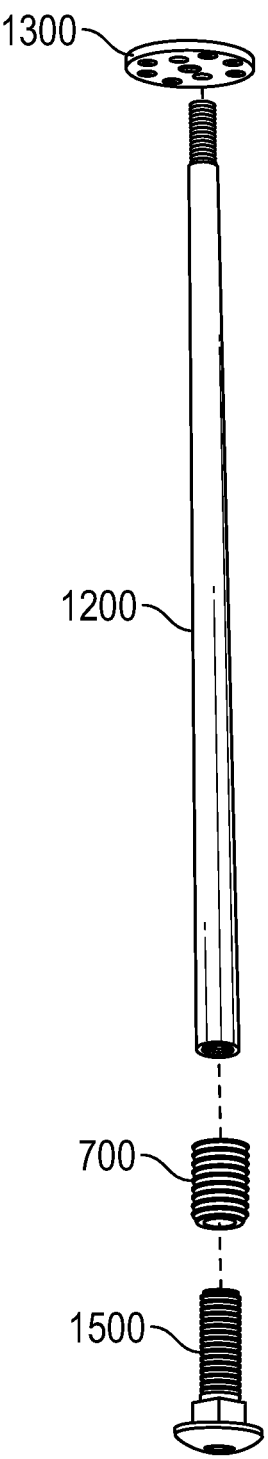
FIG. 11 illustrates an exploded view of a leg plate, a leg rod, a housing tube screw, and a foot, according to an embodiment.

FIG. 11 illustrates an exploded view of a leg plate 1300, a leg rod 1200, a housing tube screw 700, and a foot 1500, according to an embodiment. The leg plate 1300 is configured to be affixed to the furniture bottom 170 and the leg rod 1200 is configured to be threaded into the leg plate 1300. Additionally, the leg rod 1200 is configured to be inserted into the interior of a furniture leg 130. Further, a housing tube screw 700 is configured to be engaged with a threaded portion of the furniture leg 130 and further configured to engaged with a foot 1500.

Figure 12:
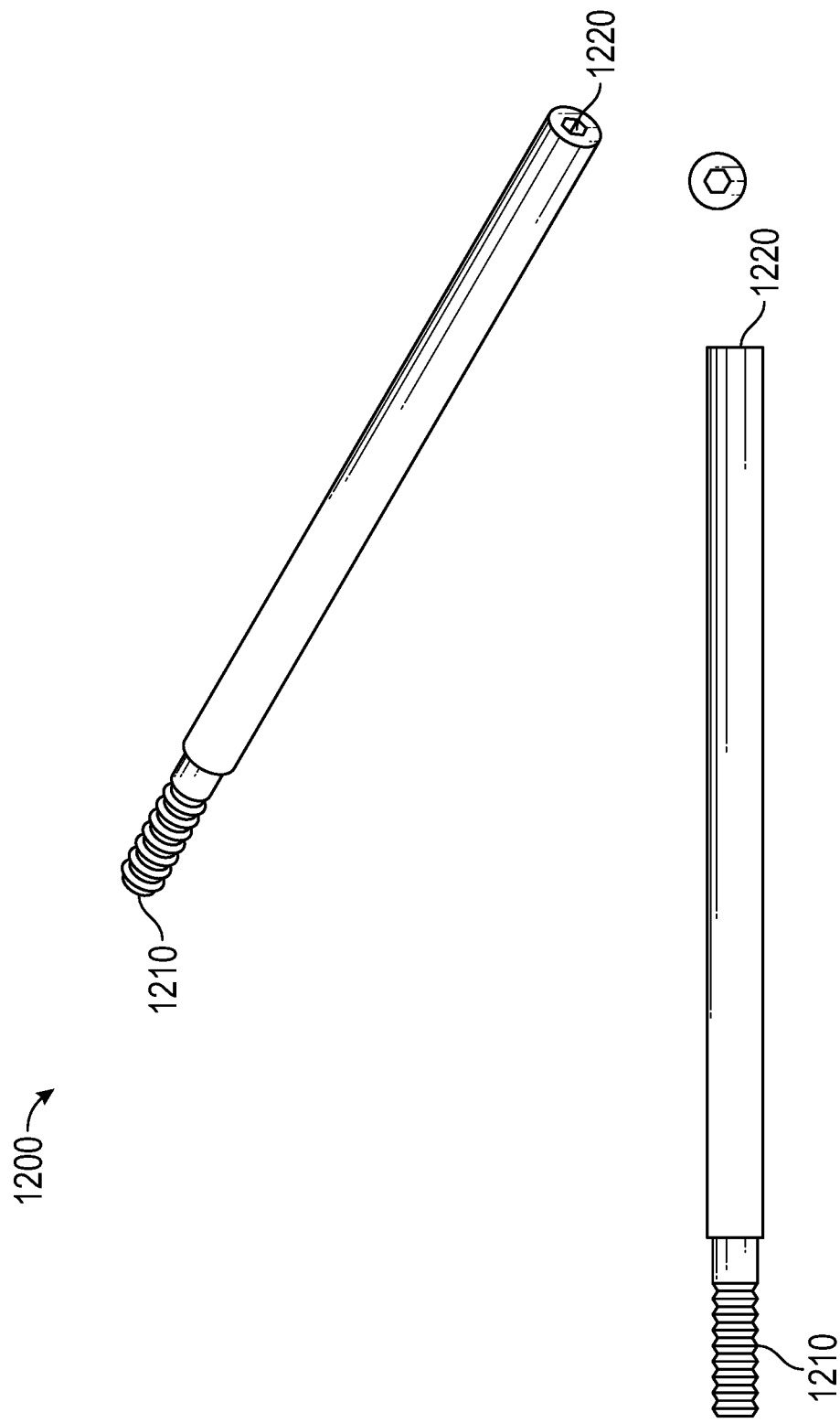
FIG. 12 illustrates a leg rod, according to an embodiment.

FIG. 12 illustrates a leg rod 1200, according to an embodiment. The leg rod 1200 is a generally cylindrical tube that includes an exterior threaded end 1210 and a tool head end 1220. The exterior threaded end 1210 is configured to be engaged with the leg plate 1300. The tool head end 1220 is configured to be engaged with a tool, such as the long screw driver, allen wrench or similar tool used to assemble the furniture leaves 110, 120.

The leg rod 1200 has a diameter that is smaller than the housing tube screw 700 and furniture leg 130, and smaller than the diameter of a threaded end of the foot 1500. Embodiments include leg rod 1200 that are between 5 and 12 inches, 12 and 27 inches, 27 to 41 inches in length, and so forth. The diameter of the leg rod 1200 is between 0.625 and 0.75 inches and so forth.

Embodiments of the leg rod 1200 are tapered at the exterior threaded end 1210 to allow the threaded portion of the leg rod 1200 to protrude from an aperture cut into the furniture leg 130, and to restrain the remainder of the leg rod 1200 from exiting the apertures on the furniture leg bottom 132.

Figure 13:
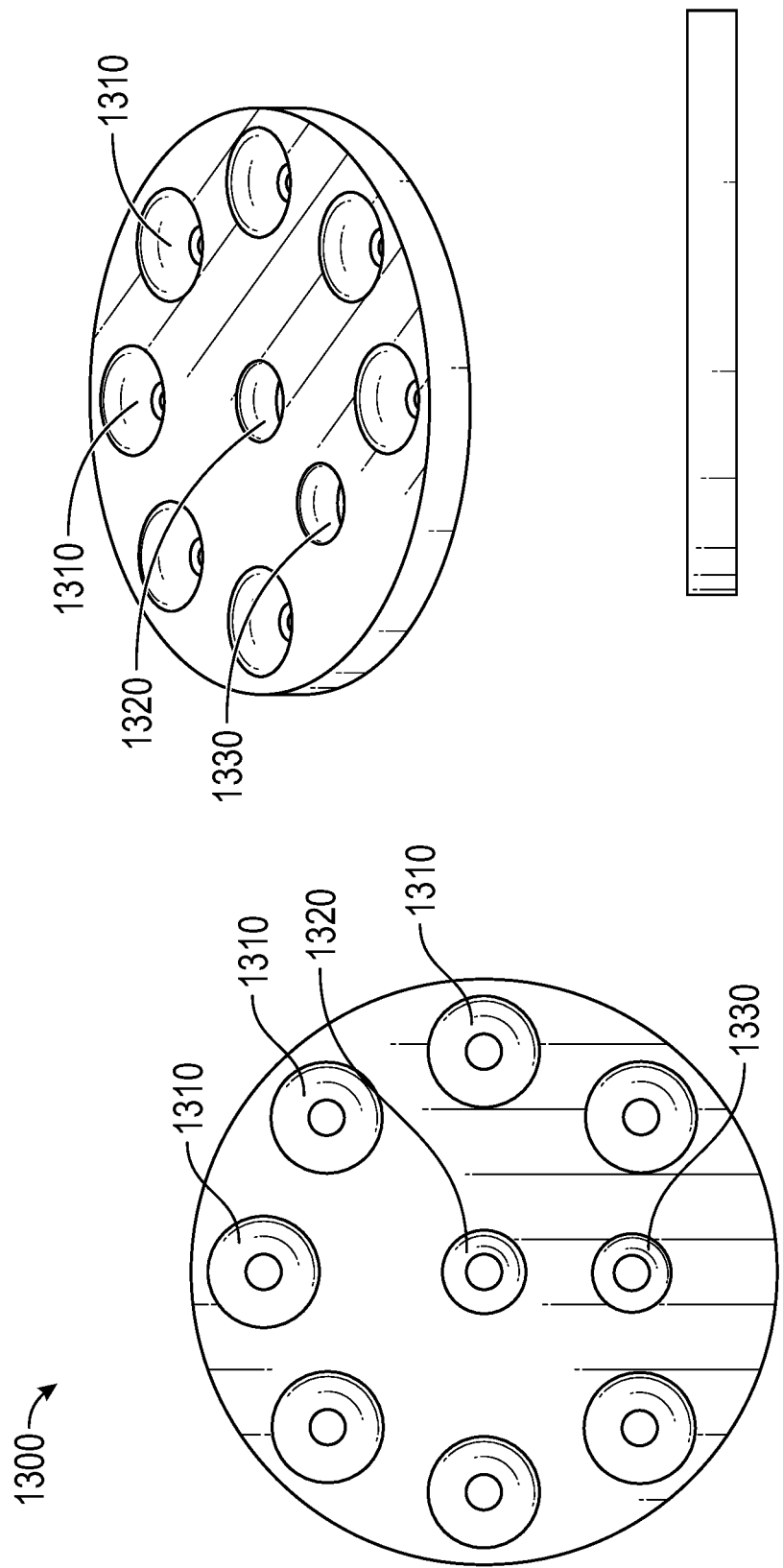
FIG. 13 illustrates a leg plate, according to an embodiment.

FIG. 13 illustrates a leg plate 1300, according to an embodiment. In an embodiment, the leg plate 1300 is a generally flat circular plate that contains multiple screw holes 1310, a leg rod hole 1320, and a stabilizer hole 1330. Embodiments can include between three and ten screw holes 1310. The number of screw holes can be varied to provide additional stability and rigidity to the interchangeable ready to assemble table 100. The screw holes can be threaded or unthreaded and can be countersunk or non-countersunk. The screw holes 1310 are configured to accept screws, nails, bolts or other assembly components to affix the leg plate 1300 to the furniture bottom 170 of a furniture leaf 110, 120, the leg plate 1300 is affixed to the large furniture leaf 110 to provide added stability. A preferred embodiment contains countersunk screw holes 1310. The leg rod hole 1320 is configured to be threaded and to accept the leg rod 1200 thereby affixing the furniture leg 130 to the large furniture leaf 110. The diameter of the leg rod 1200 is smaller than the diameter of the leg rod hole 1320 allowing the leg rod 1200 to be threaded into the leg role hole 1320.

Embodiments include the leg plate 1300 positioned or located on the furniture bottom 160 towards the corner of the furniture side end 150 and the furniture head end 140, and the corner opposite the connector 400 (or closer to the housing tube 600-housing tube screw 700 only end). The location of the leg plate 1300 can be varied to provide support and structure to the table 100 as well as for aesthetic purposes.

Figure 14:
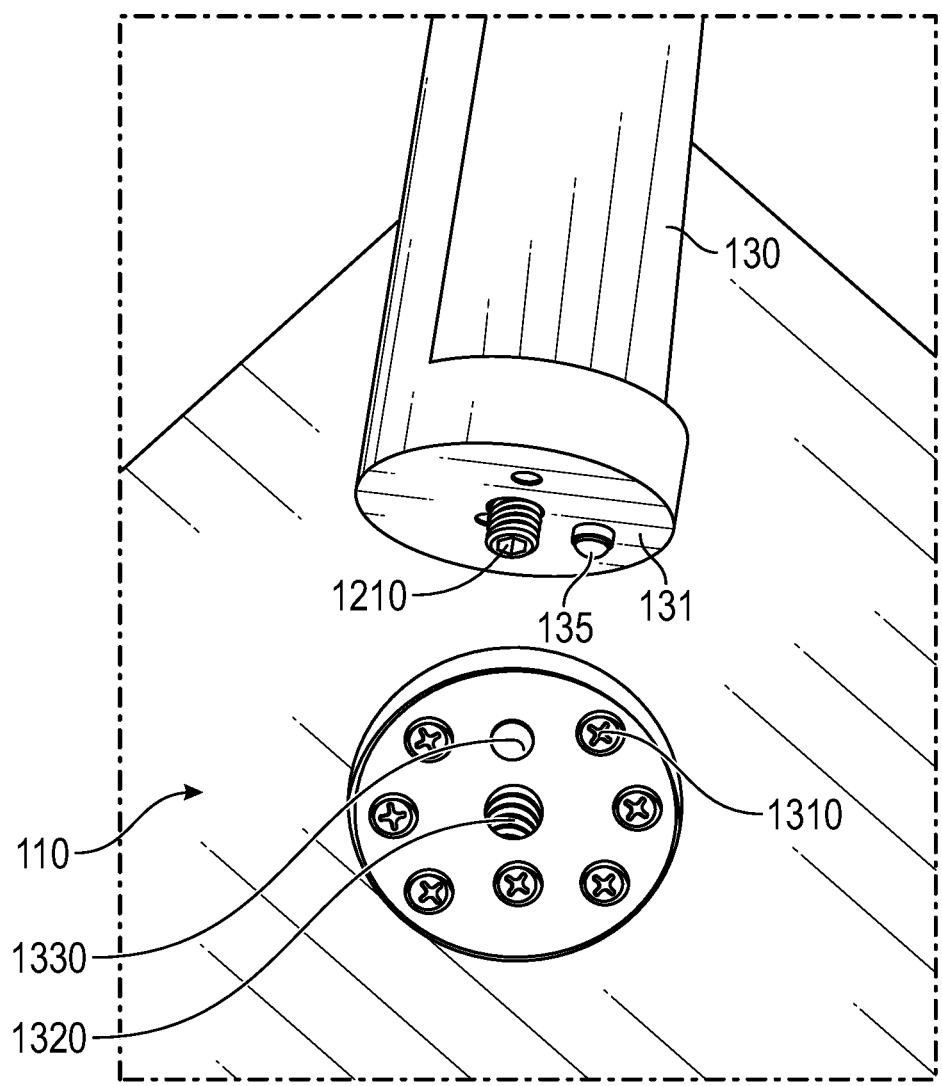
FIG. 14 illustrates a furniture leg top and leg plate, according to an embodiment.

FIG. 14 illustrates a furniture leg top 131 and leg plate 1300, according to an embodiment. The furniture leg top 131 is configured to contain a stabilizer appenditure 135 that is configured to engage with the stabilizer hole 1330 on the leg plate 1300. The engagement of the stabilizer appenditure 135 and the stabilizer hole 1330 allows the leg rod 1200 to be tightened into the leg plate 1300 without the furniture leg 130 spinning or rotating. The stabilizer appenditure 135 can be a screw head, a tab, a bolt, or a similar component configured to engage the stabilizer hole 1330. Essentially 135 is part of replacing the traditional mortice and tenant system.

The furniture leg 130 is configured with an aperture or channel that runs from the furniture leg top 131 to the furniture leg bottom 132. The aperture in the furniture leg 130 is configured to accept the leg rod 1200. The leg rod 1200 is inserted into the furniture leg bottom 132 with the exterior threaded end 1210 inserted towards the furniture leg top 131. The exterior threaded end 1210 of the leg rod 1200 extends beyond the aperture in the furniture leg top 131. Embodiments include a tapered exterior threaded end 1210 and a tapered aperture that provide added stability to the furniture leg 130 by trapping the wider portion of the leg rod 1200 behind the tapered aperture in the furniture leg top 131.

The furniture leg top 131 is lined up with the leg plate 1300 such that the stabilizer appenditure 135 is engaged with the stabilizer hole 1330 and the exterior threaded end 1210 of the leg plate is engaged with the leg rod hole 1320 of the leg plate 1300. A tool such as the long screw driver, long allen wretch or similar tool to the one used to assemble the furniture leaves 110, 120 is inserted into the furniture leg bottom 132 aperture and engaged with the tool head end 1220 of the leg rod 1200. The tool is twisted to tighten the exterior threaded end 1210 of the leg rod 1200 into the leg rod hole 1320 of the furniture plate 1300. The stabilizer appenditure 135 provides stability to the furniture leg 130 and prevents unwanted rotation of the furniture leg 130 during tightening of the leg rod 1200.

Figure 15:
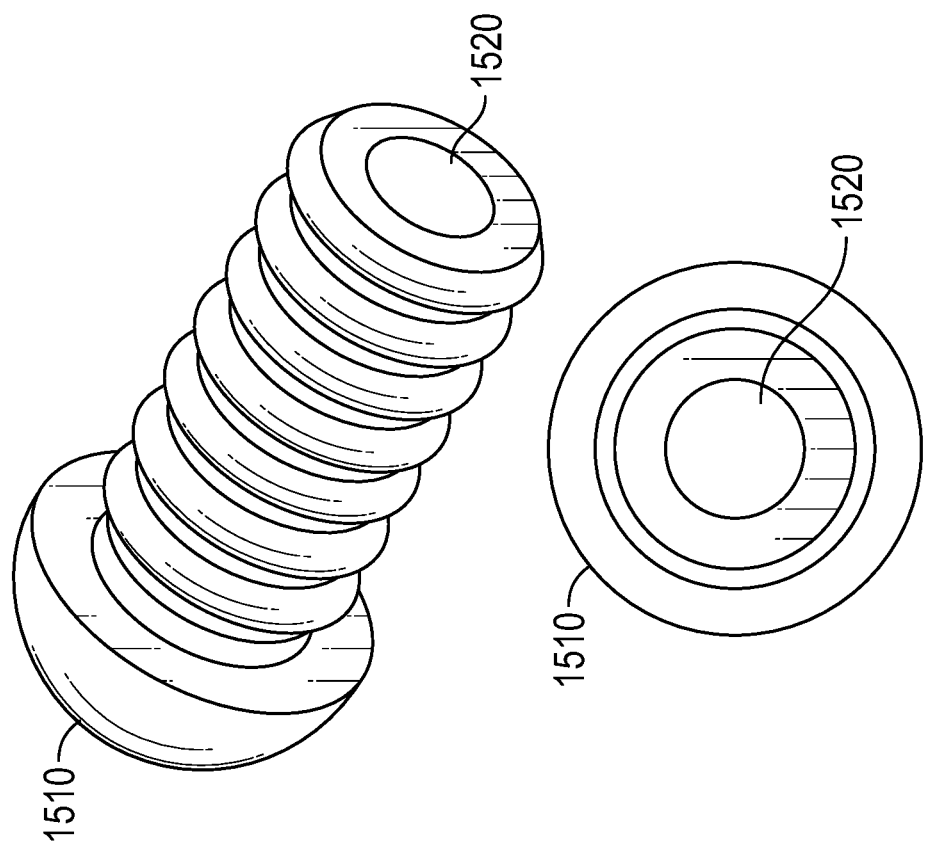
FIG. 15 illustrates a foot, according to an embodiment.
Figure 15:
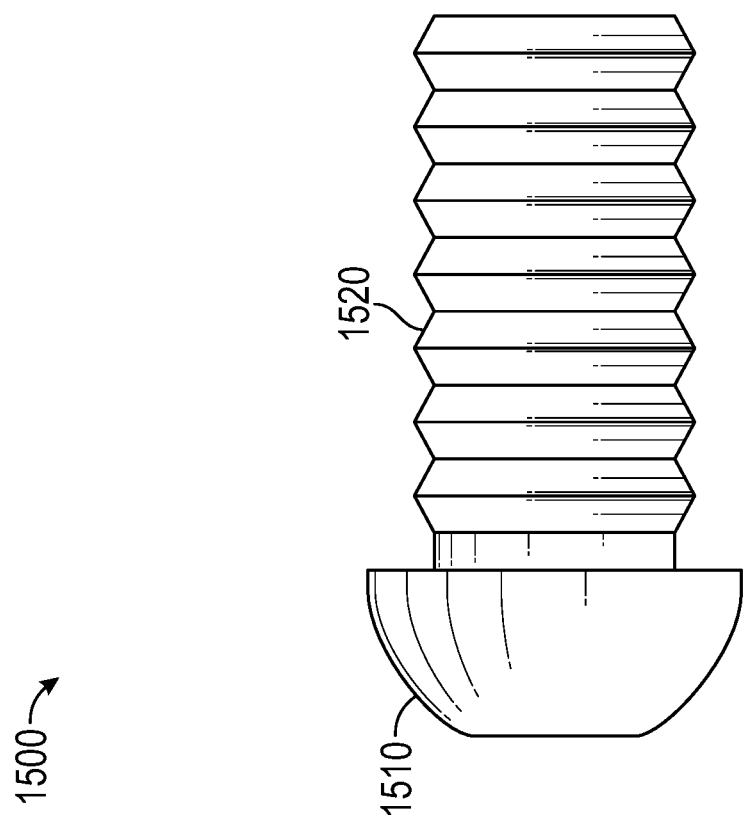

FIG. 15 illustrates a foot 1500, according to an embodiment. The foot 1500 is screw that contains a screw head end 1510 and a threaded end 1520. The screw head end 1510 has a larger diameter than the threaded end 1520. Embodiments include foot 1500 that are preferably between 5 and 0.5 inches, preferably between 3 inches and 1 inch, most preferably 2 inches in length. The diameter of the threaded end 1520 of the foot 1500 is between 3 and 0.5 inches, preferably 2 and 0.75 inches, most preferably 1 inch. The threaded hole diameter is generally 0.375 inches.

The foot 1500 is configured to be threaded into a housing tube screw 700. The foot 1500 has a hole that runs through it so that a tool such as an allen wrench can reach through 1500 to reach the tool end of 1200, otherwise labeled 1220 allowing the furniture leg 130 to be added and removed without ever removing 1500. 1500 can be adjusted by twisting further in or out of 700 (such as via by hand or a wrench) creating a leveling affect for the furniture which provides further stability.

The high stability and compression provided by embodiments employing the furniture leg 130-leg rod 1200-leg plate 1300 component affixed to the furniture top components (for example the large and small furniture leaves 110, 120) allows for interchangeable ready to assemble table 100 that does not require a furniture skirt. Furniture skirts are support components on the bottom of furniture that provide added stability and support at the junction of the furniture top and the furniture legs. Removing the furniture skirt provides less complicated assembly, a lighter overall furniture, less required construction materials, and a more aesthetic appearance. Additionally, embodiments provide greater stability than conventional furniture because of the high-quality hardware and assembly features provided by the furniture hardware components and furniture top components of the embodiments.

In an embodiment two large furniture leaves 110 are joined via the hardware components, and four furniture legs 130 are connected to the joined two large furniture leaves 110. Two furniture legs 130 are affixed to furniture leg plates 1300 affixed to a large furniture leaf 110, and two additional furniture legs 130 are affixed to furniture leg plates 1300 affixed to a second large furniture leaf 110.

A short furniture leaf 120 can be attached on both exterior furniture head ends 140 of the large furniture leaves 110 to form a table 100 with four leaves (two large furniture leaves 110 and two small furniture leaves 120). Additional furniture leaves 110, 120 can be added to the table 100 to extend the length of the table 100. If needed, additional furniture leaves 110, 120 with affixed furniture legs 130 can be added for stability.

Embodiments are configured such that the side of the table 100 with the housing tube screw cap 800 is on the most external furniture head end 140 of the table 100. For example, a furniture containing four furniture leaves 120A-110A-110B-120B (arranged left to right) can have connectors extending from the left furniture head end 140 of furniture leaf 110B into the right furniture head end 140 of furniture leaf 110A, furniture leaf 120A can have connectors 400 extending from the right furniture head end 140 into the left furniture head end 140 of furniture leaf 110A, and furniture leaf 120B can have connectors 400 extending from the left furniture head end 140 into the right furniture head end 140 of furniture leaf 110B. This configuration allows for additional furniture leaves 110, 120 to be added at either exterior furniture head end 140 of the table 100, and for housing tube cap ends 800 to seal the exterior furniture head ends 140 to provide a finished flush appearance.

The interchangeable ready to assemble table 100 can also be configured as a coffee furniture. Furniture leaves 110 and 120 can be employed with shorter furniture legs 130. The furniture leaves 110, 120 from the coffee furniture and table 100 are interchangeable. The furniture leaves 110, 120 can also be used as shelving components. In embodiments including shelving components or shelves, the furniture hardware components can be engaged with housing screw ends mounted on a wall. The exterior furniture head end 140 can then be sealed with housing tube screw caps 800.

The furniture top components, including the small and large furniture leaves are configured to be assembled and disassembled with a single tool and replace a mortice and tenant connection. Additionally, the furniture top components and furniture legs are configured to be disassembled and assembled into multiple furniture configurations, including, coffee table, media/console table, desk, benches, wall shelves, floating desks, bed frames, couches, dressers and other furniture configurations or case goods that normally require a mortice and tenant connection.

The hardware components discussed herein may be prepared from sturdy rigid materials including metals, such as stainless steel, titanium, aluminum, ceramics, rigid polycarbonate materials, or other suitable materials. the hardware components are prepared from stainless steel or iron.

The furniture top components, including the large furniture leaf 110, small furniture leaf 120, as well as the furniture leg 130 are prepared from strong rigid materials such as real wood, including, but not limited to hard woods such as, alder, balsa, beech, cherry, hickory, mahogany, maple, oak, teak, and walnut, and softwoods such as cedar, Douglas fir, juniper, pine, redwood, spruce, and yew. They can also be used in all types of materials such as plastic, veneer, or any and all types of materials that could be used to build furniture.

The furniture top components and furniture leg can also be prepared from rigid materials such as polycarbonates, ceramics, metals, such as aluminum, stainless steel, copper, brass, and mild steel, the furniture top components and furniture leg are prepared from high quality hard wood such as oak or walnut.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A device comprising:
   furniture top components comprising:
   a first large furniture leaf and a second large furniture leaf, and
   a first small furniture leaf and a second small furniture leaf; and
   furniture hardware components comprising:
   a cylindrical connector comprising an exterior threaded end, an unthreaded end, and a second exterior threaded portion,
   a cylindrical connector rod comprising an interior threaded end and a tool head end,
   a cylindrical housing tube comprising a first interior threaded end and a second interior threaded end,
   a first cylindrical housing tube screw and a second cylindrical housing tube screw,
   a third cylindrical housing tube screw and a fourth cylindrical housing tube screw, and
   a housing tube screw cap;
   wherein the cylindrical connector is configured to engage with the cylindrical connector rod and the first cylindrical housing tube screw, the cylindrical housing tube is configured to engage with the first and second cylindrical housing tube screws, and the housing tube screw caps are configured to engage with the third and fourth cylindrical housing tube screws;
   wherein the furniture hardware components are configured to be embedded in the furniture top components; and
   the device further comprising:
   a furniture leg,
   a leg plate comprising screw holes and a leg rod hole, and
   a cylindrical leg rod comprising a threaded end and a tool head end;
   wherein the leg plate is configured to be attached to the furniture top components, the leg rod is configured to be embedded in the furniture leg, and the threaded end of the leg rod is configured to be engaged with the leg rod hole in the leg plate.

2. The device of claim 1,
   wherein the furniture leg comprises a furniture leg bottom and a furniture leg top, and the furniture leg top further comprises a stabilizer appenditure,
   wherein the leg plate further comprises a stabilizer hole, and
   wherein the stabilizer appenditure is configured to engage the stabilizer hole.

3. The device of claim 1, wherein the furniture hardware components further comprise housing tube screw caps configured to engage the housing tribe screws.

4. The device of claim 1, comprising a foot, the foot further comprising a screw head end and a threaded end, and wherein the threaded end of the foot is configured to engage a cylindrical housing tube screw.

5. The device of claim 1, wherein the furniture top components and the furniture leg are prepared from wood, wherein the wood comprises at least one of alder, balsa, beech, cherry, hickory, mahogany, maple oak, teak, walnut, cedar, Douglas fir, juniper, pine, redwood, spruce, or yew.

6. The device of claim 1, wherein the furniture hardware components, the leg rod and the leg plate are prepared from metals selected from the group consisting of aluminum, stainless steel, copper, brass, and mild steel.

7. The device of claim 1, wherein the first and second large furniture eaves contain four sets of hardware components and the four sets of furniture hardware components are configured to engage with the four sets of furniture hardware components in the second furniture leaf.

8. The device of claim 7, wherein the first and second small furniture leaves contain four sets of furniture hardware components and the four sets of furniture hardware components of the first small furniture leaf are configured to engage with the four sets of furniture hardware components of the first large furniture leaf, and the four sets of furniture hardware components of the second small furniture leaf are configured to engage with the four sets of furniture hardware components of the second large furniture leaf.

9. A method of assembling furniture comprising:
   a furniture top component comprising a first furniture leaf, wherein the first furniture leaf comprises four sides, a first furniture head end, a second furniture head end, a first furniture side end, and a second furniture side end;
   first furniture hardware components comprising:

a cylindrical connector comprising an exterior threaded end, an unthreaded end, and a second exterior threaded portion, a cylindrical connector rod comprising an interior threaded end and a tool head end, a cylindrical housing tube comprising a first interior threaded end and a second interior threaded end, and a first cylindrical housing tube screw and a second cylindrical housing tube screw;

a third cylindrical housing tube screw and a fourth cylindrical housing tube screw wherein the exterior threaded end of the cylindrical connector is engaged with the interior threaded end of the cylindrical connector rod, a first cylindrical housing tube screw is engaged with the second exterior threaded portion of the cylindrical connector, a first end of the cylindrical housing tube is engaged with the cylindrical connector rod and the first cylindrical housing tube screw;

wherein the first furniture hardware components are embedded in an aperture in the first furniture leaf, wherein the aperture extends lengthwise from a first furniture head end to a second furniture head end of the first furniture leaf.

10. The method of claim 9, further comprising:

a furniture leg, a leg plate comprising screw holes and a leg rod hole, and a cylindrical leg rod comprising a threaded end and a tool head end;

wherein the leg plate is affixed to the first furniture leaf, the leg rod is embedded in an aperture in the the furniture leg, and the threaded end of the leg rod is engaged with the leg rod hole in the leg plate.

11. The method of claim 10 further comprising a second furniture leaf, wherein:

the second furniture leaf comprises second furniture hardware components; and the second furniture hardware components are configured to connect with the first furniture hardware components.

12. The method of claim 11, wherein:

the first furniture leaf comprises two furniture legs and the second furniture leaf comprises two furniture legs; and the method further comprises engaging a housing tube screw cap and a housing tube screw with a second interior threaded end of the housing tube in the furniture hardware components.

13. The method of claim 12 further comprising a third furniture leaf and a fourth furniture leaf, wherein the third leaf comprises a third furniture leaf hardware component and the fourth furniture leaf comprises a fourth furniture hardware component; and the third furniture leaf hardware: components are engaged with the first furniture hardware components; and the fourth furniture hardware components are engaged with the fourth furniture leaf hard ware components.

14. The method of claim 9 wherein:

the furniture comprises four furniture legs; and the method further comprising engaging a housing tube screw cap, and a housing tube screw with a second interior threaded end of the housing tube in the first furniture hardware components.

15. A system for interchangeable ready to assemble furniture comprising:

a furniture top component comprising a furniture leaf; and furniture hardware components comprising:

a cylindrical connector comprising an exterior threaded end, an unthreaded end, and a second exterior threaded portion, a cylindrical connector rod composing an interior threaded end and a tool head end, a cylindrical housing tube comprising a first interior threaded end and a second interior threaded end, a first cylindrical housing tube screw and a second cylindrical housing tube screw; and wherein the cylindrical connector configured to engage with the cylindrical connector rod and the first cylindrical housing tube screw, the cylindrical housing tube is configured to engage with the first and second cylindrical housing tube screws;

wherein the furniture hardware components are configured to be embedded in the furniture top components.

16. The system of claim 15 further comprising:

a furniture leg, a leg plate comprising multiple screw holes and a leg rod hole, and a cylindrical leg rod comprising a threaded end and a tool head end;

wherein the leg plate is configured to be attached to the furniture top components, the leg rod is configured to be embedded in the furniture leg, and the threaded end of the leg rod is configured to be engaged with the leg rod hole in the leg plate.

17. The system of claim 16, wherein the furniture leg comprises a furniture leg bottom and a furniture leg top, and the furniture leg, top further comprises a stabilizer appenditure, and wherein the leg plate further comprises a stabilizer hole, wherein the stabilizer appenditure is configured to engage the stabilizer hole;

and wherein the system further comprises a foot, the foot further comprising a screw head end and a threaded end, and wherein the threaded end of the foot is configured to engage a cylindrical housing tube screw and the tool head end of the cylindrical rod.

18. The system of claim 16, wherein the furniture leaf is configured to be assembled and disassembled with a single tool, and wherein the disassembled furniture top component is configured to be assembled into multiple furniture configurations.

19. The system of claim 18, wherein the furniture leaf is configured to be assembled into shelves, Wherein housing tube screws are mounted on a wall, the system further comprising housing tube screw caps configured to engage the housing tube screws on a furniture head end of the furniture leaf.

20. The system of claim 18, comprising one furniture leaf and four furniture legs, wherein the system further comprising housing tube screw caps configured to engage the housing tube screws.

\* \* \* \* \*